United States Patent
Eto et al.

(10) Patent No.: US 7,216,434 B2
(45) Date of Patent: May 15, 2007

(54) ELECTRIC-POWERED CUTTING MACHINE

(75) Inventors: Naoya Eto, Ibaraki (JP); Shinichi Sakuma, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 10/419,169

(22) Filed: Apr. 21, 2003

(65) Prior Publication Data

US 2003/0196338 A1    Oct. 23, 2003

(30) Foreign Application Priority Data

Apr. 22, 2002 (JP) ............................ P2002-118847
Nov. 1, 2002 (JP) ............................ P2002-320346

(51) Int. Cl.
  *B23D 51/10* (2006.01)
  *B27B 19/09* (2006.01)
  *B23D 51/08* (2006.01)
  *B27B 19/02* (2006.01)

(52) U.S. Cl. ............................ 30/394; 30/339; 30/392; 83/698.31; 83/699.21; 279/77

(58) Field of Classification Search ................. 30/337, 30/338, 392, 393, 394, 339; 83/699.21, 698.31, 83/698.71; 279/76, 77, 79
See application file for complete search history.

(56) References Cited

U.S. PATENT DOCUMENTS 5,306,025 A * 4/1994 Langhoff ...................... 279/90
5,487,221 A * 1/1996 Oda et al. ...................... 30/392
5,647,133 A * 7/1997 Dassoulas ...................... 30/392
5,697,279 A * 12/1997 Schnizler et al. ..... 83/699.21 X
5,722,309 A 3/1998 Seyerle ...................... 83/699.21
5,794,352 A 8/1998 Dassoulas ...................... 30/392
5,941,153 A * 8/1999 Chang ................. 83/699.21 X
6,009,627 A * 1/2000 Dassoulas et al. ............. 30/392
6,023,848 A * 2/2000 Dassoulas et al. ............. 30/392
6,295,736 B1 * 10/2001 Dassoulas et al. ............. 30/392
6,357,124 B1 3/2002 Wall et al. ...................... 30/376

(Continued)

FOREIGN PATENT DOCUMENTS

DE    41 02 011    * 12/1991    ................. 30/166.3

(Continued)

OTHER PUBLICATIONS

Chinese Office Action dated Oct. 22, 2004, with English translation.

*Primary Examiner*—Clark F. Dexter
(74) *Attorney, Agent, or Firm*—McGinn IP Law Group, PLLC

(57) ABSTRACT

An electric-powered cutting machine includes: an electric motor, a housing for the electric motor; a plunger driven by the electric motor to reciprocate; and a blade holding mechanism. The blade holding mechanism holds a blade at a tip end portion of the plunger. The blade holding mechanism includes: a blade receiving face including a groove, a swinging member and a pressing member. The groove is shaped substantially the same as an attachment portion of the blade. The swinging member has one and other ends and pivoted at a swing fulcrum. The one end has a blade pressing portion capable of being disposed to oppose to the groove. The other end elongates to separate from the plunger. The pressing member presses the one end toward the groove.

21 Claims, 10 Drawing Sheets

U.S. PATENT DOCUMENTS 6,735,876 B2 * 5/2004 Hirabayashi .................. 30/392
2002/0014014 A1 2/2002 Dassoulas et al. ............ 30/392

FOREIGN PATENT DOCUMENTS

| | | | |
|---|---|---|---|
| EP | 0 855 239 B1 | 4/2002 |
| GB | 2 328 643 A | 3/1999 |
| JP | 2001-179534 | 7/2001 |

* cited by examiner

ELECTRIC-POWERED CUTTING MACHINE

BACKGROUND OF THE INVENTION

1. Field of the Invention

The present invention relates to a jigsaw type electric-powered cutting machine having a blade holding mechanism.

2. Background Art

A conventional electric-powered cutting machine will be described with reference to FIGS. 1 and 18, taking a jigsaw as an example.

As shown in FIG. 1, a jigsaw includes: a housing 2 which has a switch 4 and a handle 3, in which a base 5 that serves as a guiding member during a cutting operation is attached to a lower side, and which houses an electric motor 100 as is known in the art and that is schematically shown in FIG. 1; and a plunger 1 which reciprocates in the vertical directions in the figure by a turning force of the electric motor 100. In the illustrated jigsaw, the plunger 1 is covered by a cover 6 which is formed by a transparent member. An upper portion of the plunger 1 is reciprocatively held inside the housing 2, and a lower portion protrudes to the outside from the housing 2. A blade 7 is detachably held by the lower portion of the plunger 1.

As shown in FIG. 18, the conventional jigsaw has a configuration in which a locking screw 28 that presses against a flat face of the blade 7, and a support member 29 that supports a flat face of the blade 7 on the side opposite in the pressing direction are attached to the tip end of the plunger 1. When the blade 7 is inserted into the plunger 1, the blade 7 can be fixed to the plunger 1 by fastening the locking screw 28.

However, the above-mentioned configuration has the inconvenience that it is necessary to use a tool for operating the locking screw 28 during a work of replacing the blade 7. Apparently, the fastening force acting on the locking screw 28 is variously changed depending on the worker, thereby causing a problem in that, when the fastening force is excessively large, the blade 7 is deformed.

As a jigsaw for solving the problem, European Patent Nos. 722,802 and 855,239 disclose a configuration in which a work of replacing a blade can be conducted without using a tool or the like.

SUMMARY OF THE INVENTION

Among the conventional jigsaws, the jigsaw disclosed in European Patent No. 722,802 is configured in the following manner. When a lever disposed on the tip end of a plunger is operated without using a tool, two projections for preventing a blade from slipping off are engaged with a wall face which is perpendicular to a tip end face of the plunger, whereby the blade can be fixed easily and irrespective of a force exerted by the worker.

Since the lever having a relatively large size is disposed on the tip end of the plunger, the plunger is heavy. Therefore, the jigsaw has a disadvantage that, during a cutting work, the plunger largely vibrates. In the plunger, an opening for inserting a blade is not clearly formed. In a work of inserting a blade into the plunger, therefore, the blade may be erroneously inserted with being inclined. In this case, there is the possibility that the blade is fixed while maintaining the inclined state. Such an inclined blade greatly affects the cutting accuracy.

The jigsaw disclosed in European Patent No. 855,239 has a configuration which can solve the problem in the blade fixing method by screwing, in the same manner as that disclosed in European Patent No. 722,802, and in which the problem discussed with respect to that disclosed in European Patent No. 722,802 is solved by disposing a clear opening for inserting a blade, and by performing the fixation through a remote operation using a lever that is disposed in a place different from the plunger.

In the configuration, a spring pressing a moving member must be designed so that the spring can be placed in a gap formed between the moving member and an outer hull, while the gap is narrowed by the remote operation using the lever. When the lever is released and the moving member is moved to a position where the member presses the blade, the spring is stretched to some extent and the pressing force is lost. In order to compensate the pressing force, therefore, a number springs must be placed in the gap. As a result, the total weight of the plunger is increased. In a jigsaw in which a plunger reciprocates at a high speed, the increased weight tends to adversely affect vibrations of the main unit of the jigsaw.

It is an object of the invention to provide a jigsaw which can eliminate the above-discussed disadvantages, and in which, without increasing the weight of a plunger, vibrations during a cutting work can be suppressed and blade replacement can be conducted easily and in a short time.

The object can be attained by configuring a blade holding mechanism so as to comprise: a blade receiving face including a groove having a shape which is substantially identical with a shape of an attachment portion of a blade including projections; a swinging member having: one end which has a swing fulcrum that elongates in a direction substantially identical with a longitudinal direction of a plunger, and a blade pressing portion that can be placed in a place opposed to the groove; and another end which elongates to separate from the plunger; and a pressing member which presses the one end of the swinging member toward the groove of the plunger.

BRIEF DESCRIPTION OF THE DRAWINGS

The present invention may be more readily described with reference to the accompanying drawings.

DETAILED DESCRIPTION OF THE PREFERRED EMBODIMENTS

Figure 1:
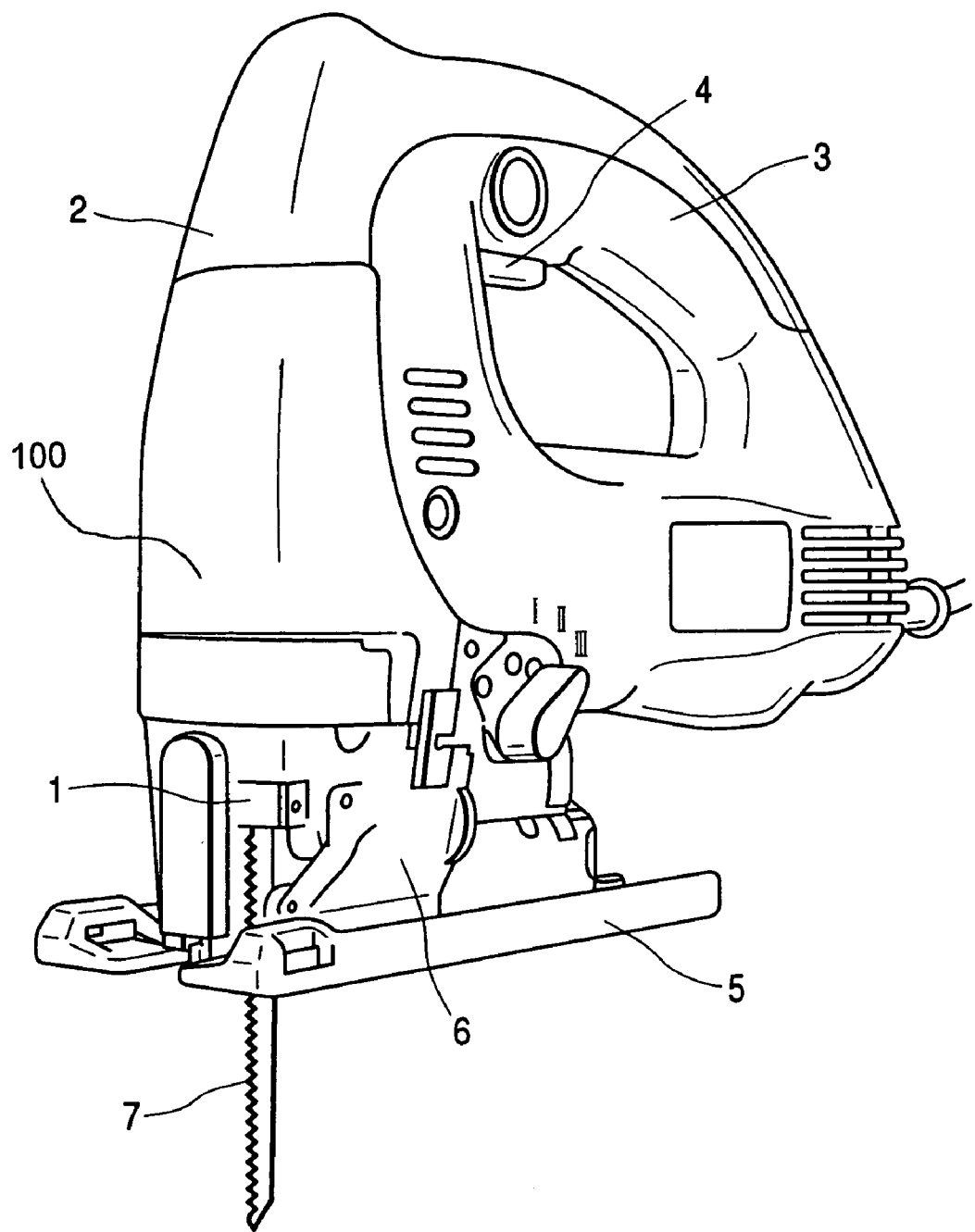
FIG. 1 is a perspective view showing an embodiment of the electric-powered cutting machine of the invention.
Figure 2:
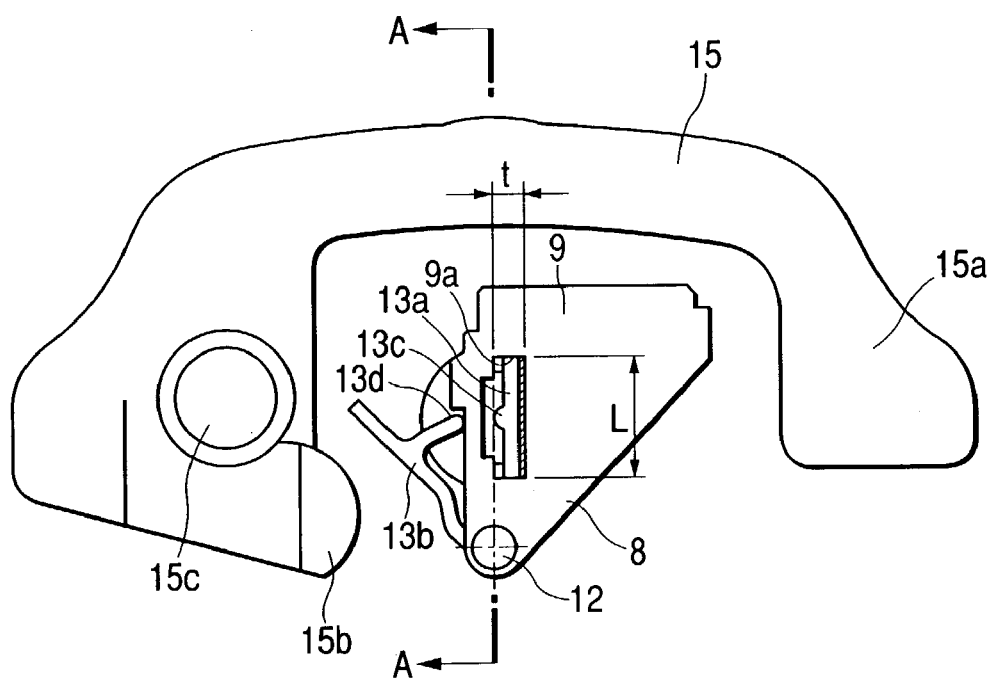
FIG. 2 is an enlarged bottom view of main portions showing the embodiment of the electric-powered cutting machine of the invention.

An embodiment of the jigsaw of the invention will be described with reference to FIGS. 1 to 10. FIG. 1 is a perspective view showing a state where the blade 7 is attached to a tip end portion of the plunger 1, FIG. 2 is an enlarged bottom view of main portions showing a blade holding mechanism, FIG. 3 is a section view taken along the line A—A in FIG. 2, and FIG. 4 is a section view taken along the line B—B in FIG. 3.

Figure 5:
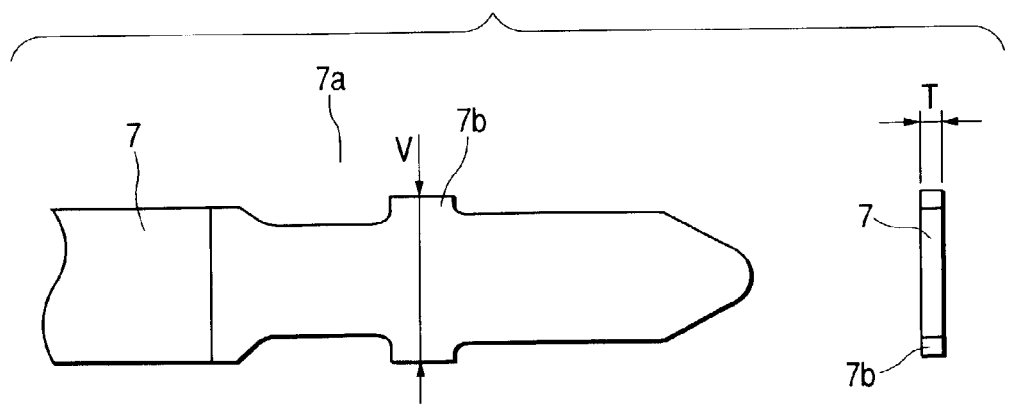
FIG. 5 shows an enlarged front view of main portions and a side view showing an example of a blade.

As shown in FIG. 5, the blade 7 which can be attached to and detached from the jigsaw of the invention has an attachment portion 7a including a pair of projections 7b which elongate perpendicular to the longitudinal direction of the blade 7.

A blade holding portion 8 is disposed in the tip end of the plunger 1 as shown in the figures. A bottom face 9 which extends perpendicular to the longitudinal direction of the plunger 1, and in which a hole 9a is formed, is disposed on the blade holding portion 8 on the side of the base 5. The hole 9a has a thickness which is smaller than the width T of the attachment portion 7a of the blade 7, and a dimension L which is larger than a dimension V between the projections 7b. The dimension V is the maximum width of the attachment portion 7a of the blade 7. The blade holding portion 8 has an upper face 10 which extends in parallel with the bottom face 9, and which is positioned in the vicinity of the lower end face of the plunger 1. A blade receiving face 11 which extends substantially parallel to the longitudinal direction of the plunger 1 is positioned between the bottom face 9 and the upper face 10 and in the vicinity of the middle of the plunger 1.

Figure 3:
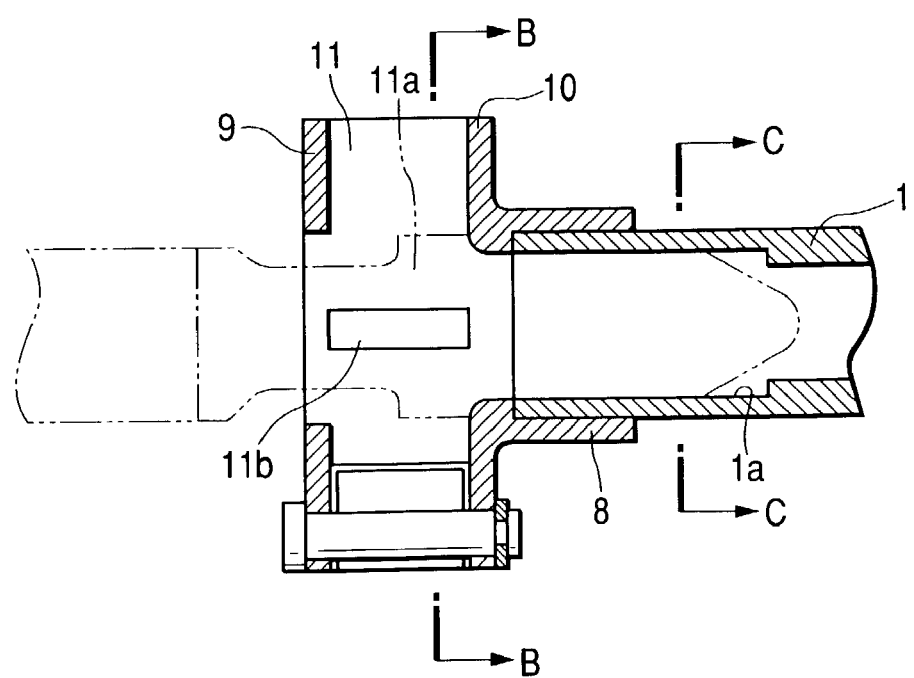
FIG. 3 is a section view taken along the line A—A in FIG. 2.
Figure 4:
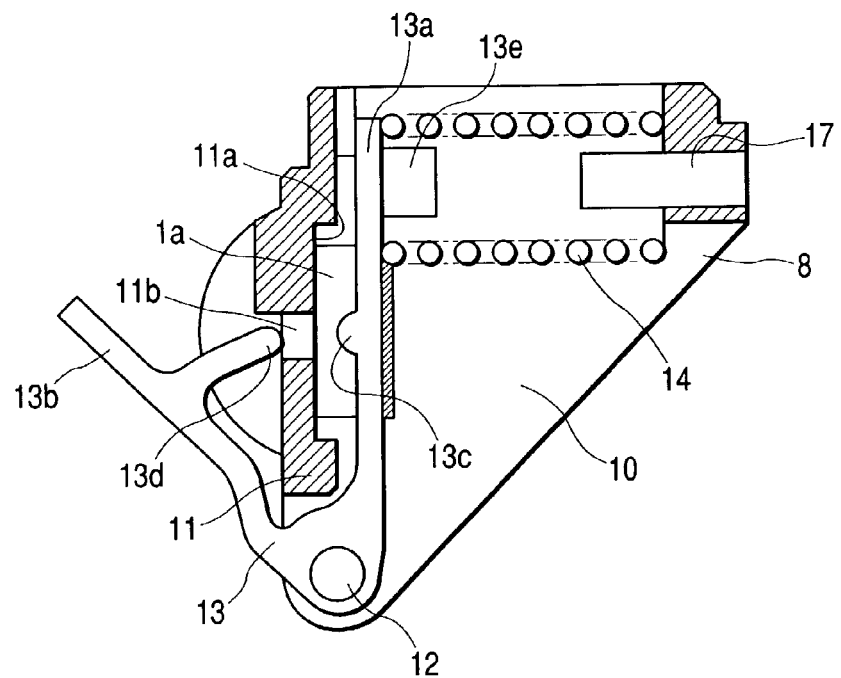
FIG. 4 is a section view taken along the line B—B in FIG. 3.

As shown in FIG. 3, a groove 11a having a shape which is substantially identical with that of the attachment portion 7a of the blade 7 is formed in the blade receiving face 11. The hole 9a of the bottom face 9 communicates with the groove 11a.

A pin 12 which is held by the upper face 10 and the bottom face 9 of the blade holding portion 8 is disposed between the upper face 10 and the bottom face 9. A swinging member 13 which uses the pin 12 as a swing fulcrum is held by the blade holding portion 8.

As shown in FIG. 4, the swinging member 13 has an approximately V-like shape, and is attached so that the pin 12 serving as a swing fulcrum is positioned in a substantially middle portion of the member. One end 13a of the member is always pressed toward the blade receiving face 11 by a spring 14 which is a pressing member for pressing an end portion of the member. The one end 13a of the swinging member 13 has a shape which can be placed substantially parallel to the blade receiving face 11, and has a hemispherical convex portion 13c in a place corresponding to the middle portion of the groove 11a. The convex portion protrudes toward the groove 11a to serve as a blade pressing portion. The center position of the pin 12 is located substantially on an extended line of the blade receiving face 11, whereby the one end 13a of the swinging member 13 is allowed to be easily placed substantially parallel to the blade receiving face 11 as described above.

Although the one end 13a of the swinging member 13 is positioned between the upper face 10 and the bottom face 9 of the blade holding portion 8, the other end 13b is not positioned between the upper face 10 and the bottom face 9, and has a shape which elongates so as to separate from the blade receiving face 11 or radially outward separate from the plunger 1.

Figure 6:
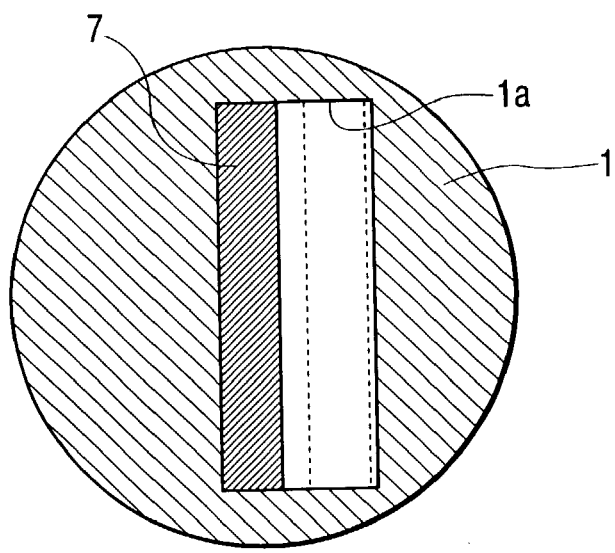
FIG. 6 is a section view taken along the line C—C in FIG. 3.

As shown in FIGS. 4 and 6, a hole 1a having an inner wall face which is substantially flush with the face of the groove 11a is formed in the plunger 1. When the blade 7 is attached, an end of the attachment portion 7a of the blade is positioned in the hole 1a of the plunger 1.

In the housing 2, a lever 15 which serves as an operation member, and which has a swing fulcrum 15c that elongates in a direction substantially identical with the longitudinal direction of the plunger 1 is disposed on the housing 2 so as to cover the blade holding portion 8. In the lever 15, an abutting portion 15b which can abut against the other end 13b of the swinging member 13 is disposed at a position close to the swing fulcrum 15c, and an operation portion 15a is formed in a place which is remote from the abutting portion 15b.

The lever 15 is pressed by a pressing member such as a torsion spring which is not shown, so as to be located at the position shown in FIG. 2. The lever can be swung with using the swing fulcrum 15c as a fulcrum, by operating the operation portion 15a.

Figure 7:
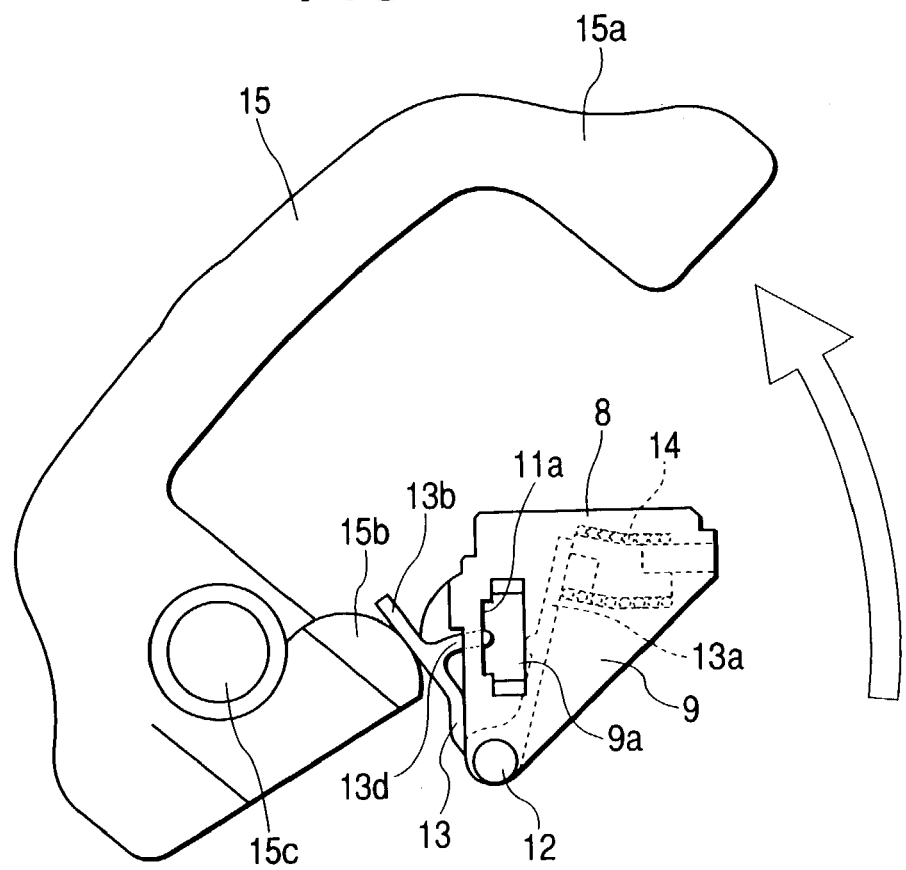
FIG. 7 is an enlarged bottom view of main portions showing an operation state of the electric-powered cutting machine of the invention.

When the lever 15 is swung, as shown in FIG. 7, the abutting portion abuts against the other end 13b of the swinging member 13. When the lever 15 is further swung, the shape of the abutting portion 15b causes the swinging member 13 to be swung so that the other end 13b of the swinging member 13 is moved toward the blade receiving face 11 against the pressing force of the spring 14.

When the operation of swinging the lever 15 is cancelled in the state of FIG. 7, the lever 15 is returned to the state shown in FIG. 2 by the pressing member (not shown). As mentioned above, the pressing member can be formed by a torsion spring. In accordance with this returning operation, the swinging member 13 is swung by the urging force of the spring 14 so that the one end 13a is moved toward the blade receiving face 11, and the other end 13b radially outward separate from the plunger 1, with the result that also the swinging member 13 is returned to the state shown in FIG. 2.

Next, the operation to be performed when the blade 7 is attached to the blade holding portion 8 will be described.

First, the lever 15 is swung against the pressing member as described above to cause the swinging member 13 to swing against the pressing force of the spring 14. The lever 15 is then held to the state shown in FIG. 7.

Figure 8:
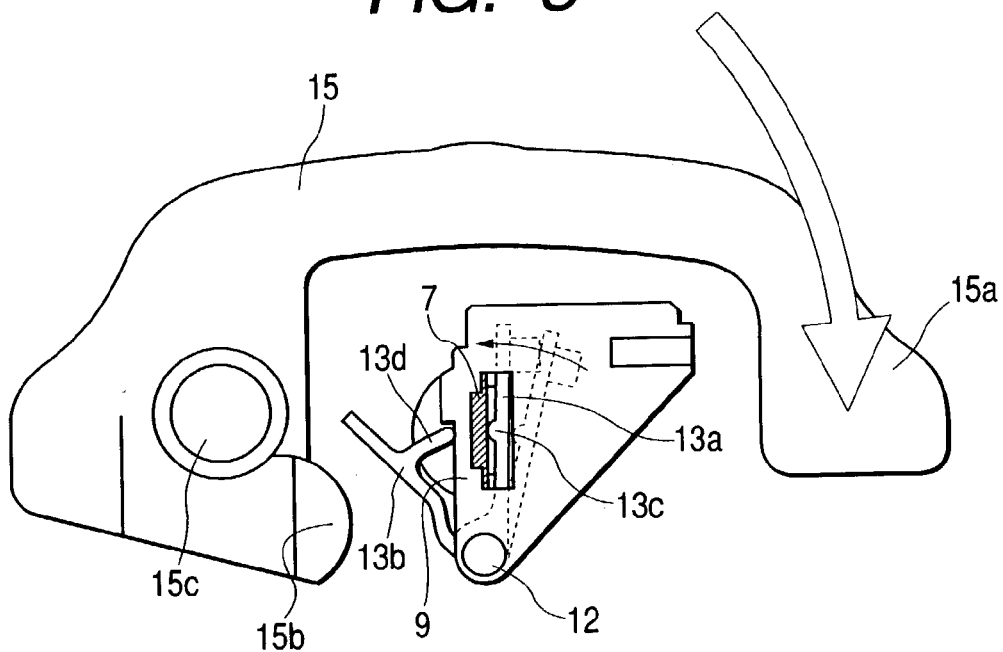
FIG. 8 is an enlarged bottom view of main portions showing an operation state of the electric-powered cutting machine of the invention.
Figure 9:
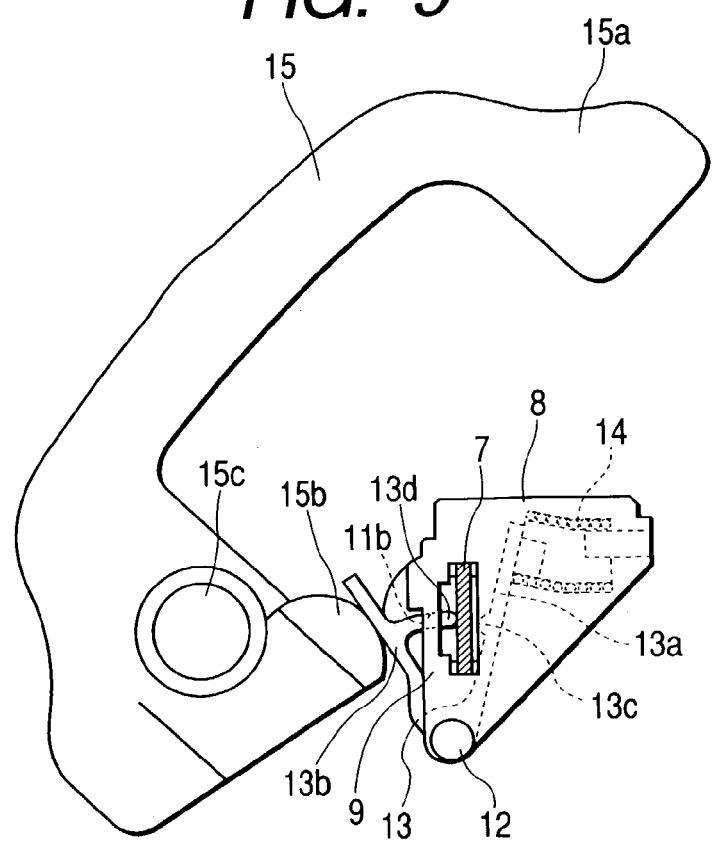
FIG. 9 is an enlarged bottom view of main portions showing an operation state of the electric-powered cutting machine of the invention.

In this state, the attachment portion 7a of the blade 7 is inserted into the blade holding portion 8 via the hole 1a of the bottom face 9 of the blade holding portion 8. The attachment portion 7a of the blade 7 is then engaged with the groove 11a of the blade receiving face 11, and the holding of the lever 15 is cancelled. As shown in FIG. 8, therefore, the lever 15 is returned to the state shown in FIG. 2, and also the swinging member 13 is returned to the state shown in FIG. 2. This causes the convex portion 13c on the one end 13a of the swinging member 13 to press the flat face of the attachment portion 7a of the blade 7 engaged with the groove 11a. As a result, the work of attaching the blade 7 to the blade holding portion 8 is ended.

The blade 7 attached to the blade holding portion 8 is prevented from downward slipping off, by the projections 7b of the blade 7 and the groove 11a opposed to the projections 7b. The upward movement of the blade 7 is restricted by butting of the upper faces of the projections 7b of the blade 7 against the inner wall face of the upper face of the blade holding portion 8.

Figure 10:
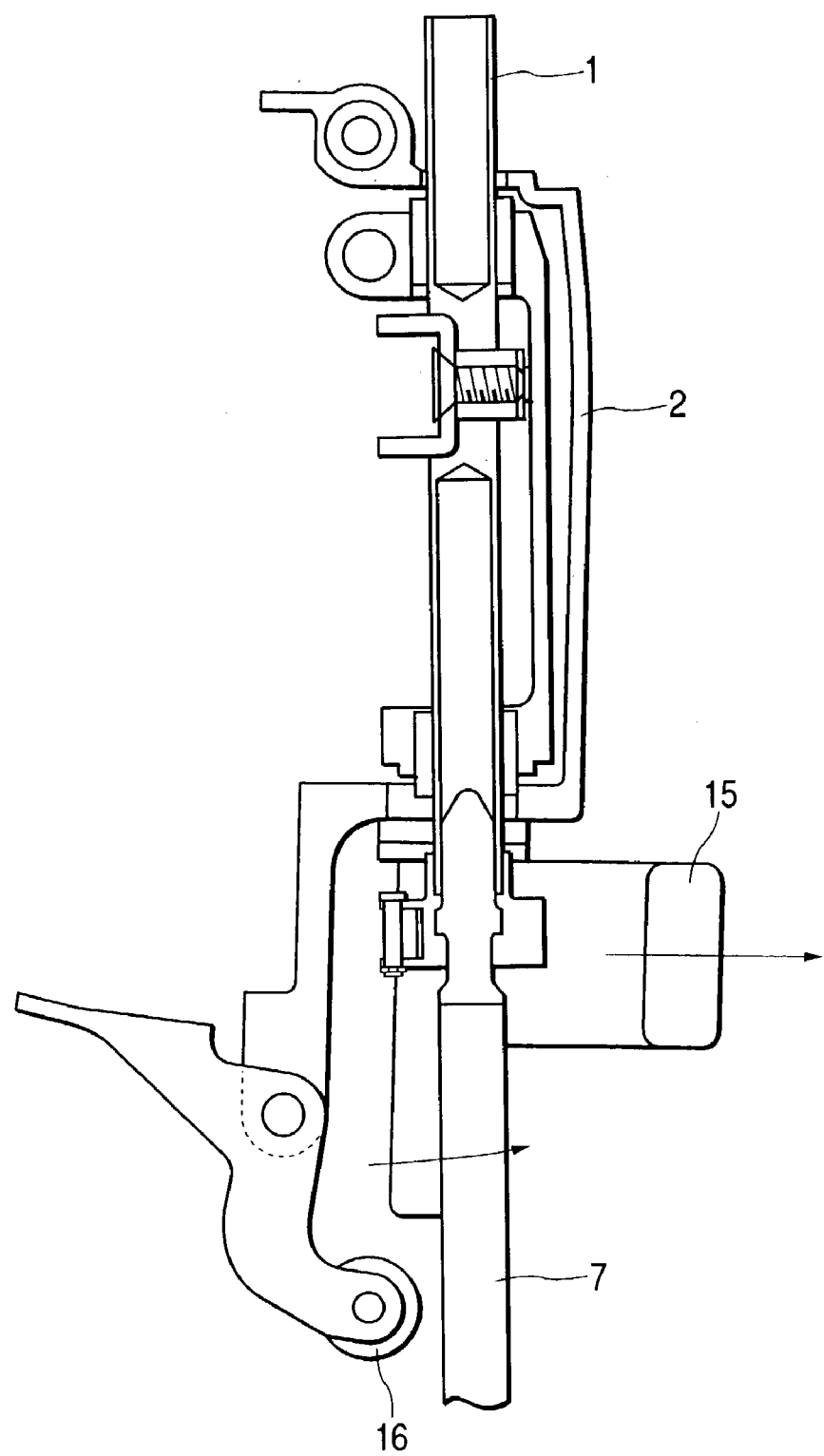
FIG. 10 is an enlarged bottom view of main portions showing an operation state of the electric-powered cutting machine of the invention.
Figure 11:
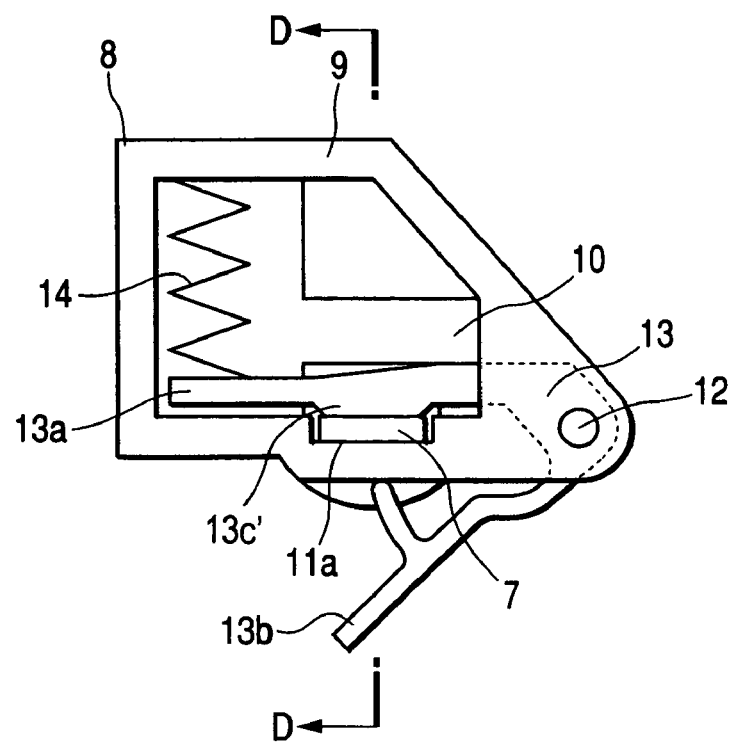
FIG. 11 is an enlarged bottom view of main portions showing another embodiment of the electric-powered cutting machine of the invention.

In the jigsaw of the embodiment, as shown in FIG. 10, the abutting portion 15b of the lever 15 has a shape which elongates in a direction substantially identical with the longitudinal direction of the plunger 1. This configuration is employed because of the following reason. Even when the blade holding portion 8, i.e., the other end 13b of the swinging member 13 against which the abutting portion 15b abuts is at any position in the reciprocal motion range of the plunger 1, the abutting portion 15b of the lever 15 can abut against the other end 13b of the swinging member 13 to enable the blade 7 to be attached or detached.

The jigsaw of the embodiment is configured so that, as shown in FIG. 2, a through hole 11b which communicates with the groove 11a is formed in the blade receiving face 11. A projecting portion 13d is capable of being inserted into the through hole 11b to protrude into the groove 11a. The projecting portion 13d is disposed on the other end 13b of the swinging member 13. According to the configuration, when the lever 15 is swung in the work of detaching the blade 7, the projecting portion 13d functions to cause the blade 7 to automatically slip off from the blade holding portion 8, whereby the workability of the replacement of the blade 7 is improved.

The jigsaw of the embodiment is configured so that the plunger 1 is rockable in the cutting direction. The jigsaw has a roller 16 for abutting against a face of the blade 7. The face is a rear face with respect to the cutting direction. The pin 12 which serves as the swing fulcrum of the swinging member 13 is positioned more rearward in the cutting direction than the center of the plunger 1 in order that, during an operation of attaching or detaching the blade 7, the plunger 1 can rock in a direction along which the plunger separates from the roller 16, i.e., toward the forward side in the cutting direction as shown in FIG. 10. When the abutting portion 15b of the lever 15 abuts against the other end 13b of the swinging member 13, a moving force acts toward the forward side in the cutting direction. According to the configuration, the work of replacing the blade 7 can be conducted without being hindered by the roller 16, whereby the workability can be improved.

As described above, the pressing force of the spring 14 serving as the pressing member acts on the vicinity of the end portion of the one end 13a of the swinging member 13 having the swing fulcrum. According to the principle of the lever, therefore, a greater pressing force can be given to the blade 7 via the convex portion 13c. In other words, it is not necessary to dispose plural springs 14 or the spring 14 of a larger size in order to obtain a pressing force which is required at minimum. Therefore, the weight of the blade holding portion 8 can be relatively reduced, so that vibrations which are caused during reciprocal motion of the plunger 1 can be suppressed. As shown in FIG. 2, the pin 12 which serves as the swing fulcrum of the swinging member 13 is placed at a position which is separated from the outer periphery of the plunger 1, and the place where the spring 14 presses the one end of the swinging member 13 is set to the vicinity of the end portion of the one end 13a, whereby the pressing force of the convex portion 13c acting on the blade 7 can be further enhanced. A convex portion 13e which is disposed on the one end 13a of the swinging member 13 so as to protrude toward the spring 14, and a pin 17 attached to the blade holding portion 8 prevent the spring 14 from slipping off from the blade holding portion 8.

As described above, the convex portion 13c is disposed on the one end 13a of the swinging member 13 as a pressing member with a hemispherical shape. The convex portion 13c presses the flat face of the blade 7 engaged with the groove 11a of the blade receiving face 11. Even when another blade 7 having a different width is inserted, therefore, the pressing force of the spring 14 acts on a substantially middle portion of the blade 7 via the convex portion 13c.

In the jigsaw of the embodiment, after the blade 7 is inserted into the blade holding portion 8 through the hole 1a of the bottom face 9, the blade 7 must be moved in the direction perpendicular to the longitudinal direction to cause the attachment portion 7a of the blade 7 to be engaged with the groove 11a of the blade receiving face 11. In the configuration of the embodiment, when the operation of the lever 15 is cancelled in the state where the blade 7 is inserted into the blade holding portion 8, the blade is guided by the convex portion 13c of the swinging member 13 to be engaged with the groove 11a. At this time, because the convex portion 13c has a hemispherical shape as described above, the convex portion 13c presses a substantially middle portion of the blade 7, and hence the blade 7 is stably guided into the groove 11a.

As described above, in the blade holding portion 8, the blade 7 must be moved in the direction perpendicular to the longitudinal direction. Therefore, the widths of the hole 1a of the plunger 1 and the hole 9a of the bottom face 9 of the blade holding portion 8 are set to have dimensions which enable the above-mentioned movement of the blade 7.

In the embodiment, the upper face 10 of the blade holding portion 8 is positioned at the upper end of the groove 11a. When the blade 7 is moved as described above in the state where the upper faces of the projections 7b of the blade 7 abut against the inner wall face of the upper face 10 of the blade holding portion 8, therefore, the attachment portion 7a of the blade 7 is engaged with the groove 11a. As a result, the movement of the blade 7 caused by the convex portion 13c of the swinging member 13 is performed more stably, and the position of the blade 7 is set when the blade 7 is inserted into the blade holding portion 8, so that the work of attaching the blade can be easily conducted.

In the embodiment, the blade holding portion 8 is formed as a member which is different from the plunger 1. Alternatively, the blade holding portion may be formed integrally with the plunger 1.

Next, another embodiment of the jigsaw of the invention will be described with reference to FIGS. 11 to 14. The components similar to those of the above-described embodiment are denoted by the same reference numerals, and their description is omitted.

The embodiment has a feature in the shape of the convex portion 13c which is disposed on the one end 13a of the swinging member 13 to function as the blade pressing portion.

As shown in the figures, a convex portion 13c' which is disposed on the one end 13a of the swinging member 13, and which presses the flat face of the blade 7 has a width which is slightly smaller than the illustrated width of the groove 11a, and has a shape which can be placed substantially parallel to the groove 11a, so that, when the blade 7 of a width which is more frequently used is engaged with the groove 11a, the convex portion can substantially come into surface contact with the flat face of the blade 7.

In the case of the hemispherical convex portion 13c in the embodiment described above, the flat face of the blade 7 and the convex portion 13c make a point contact, and there is the possibility that the blade 7 is inclined with using the convex portion 13c as a fulcrum. By contrast, according to the above-mentioned configuration, even when the blade 7 of a different width is inserted and butting between the flat face of the blade 7 and the convex portion 13c' is formed by a point contact, the face of a portion of the convex portion 13c' which is not in contact with the flat face functions to suppress the inclination, with the result that the inclination of the blade 7 can be suppressed.

Figure 12:
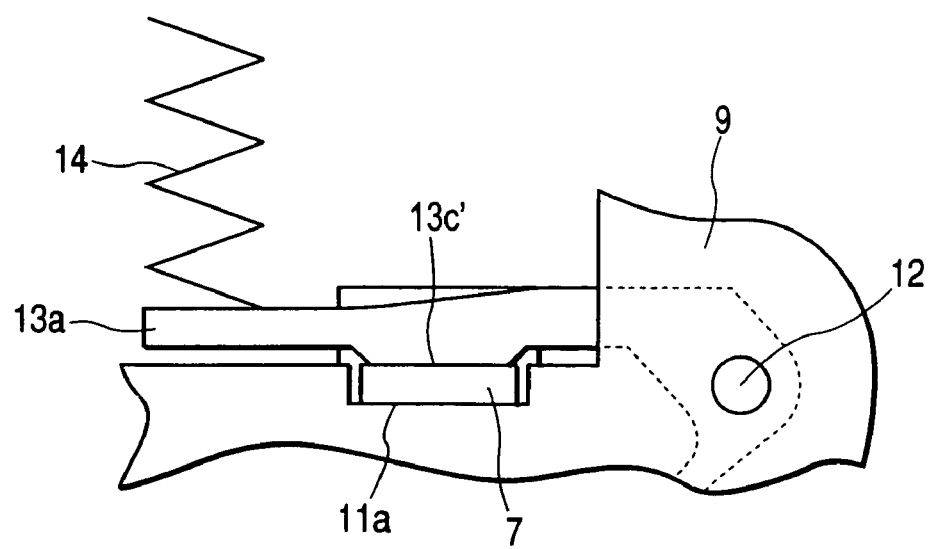
FIG. 12 is an enlarged bottom view of main portions of FIG. 11 showing an operation state of the other embodiment of the electric-powered cutting machine of the invention.
Figure 13:
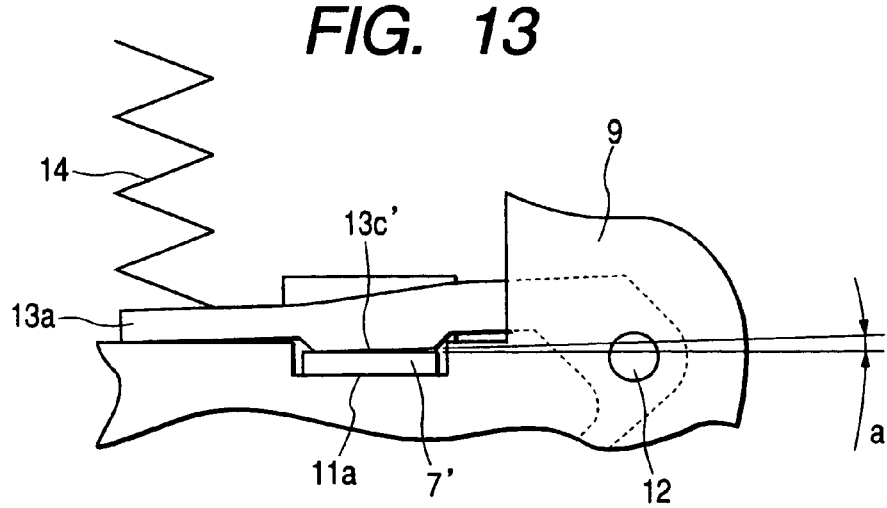
FIG. 13 is an enlarged bottom view of main portions of FIG. 11 showing an operation state of the other embodiment of the electric-powered cutting machine of the invention.
Figure 14:
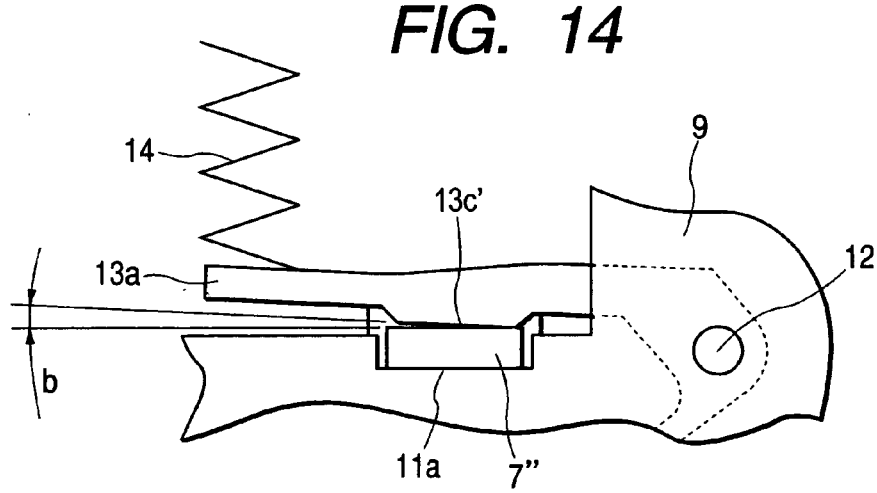
FIG. 14 is an enlarged bottom view of main portions of FIG. 11 showing an operation state of the other embodiment of the electric-powered cutting machine of the invention.

FIG. 12 is an enlarged view of main portions showing a state where the blade 7 of a thickness which is more frequently used is attached, FIG. 13 is an enlarged view of main portions showing a state where a blade 7' of a thickness which is smaller than that of the blade 7 of FIG. 12 is attached, and FIG. 14 is an enlarged view of main portions showing a state where a blade 7" of a thickness which is larger than that of the blade 7 of FIG. 12 is attached.

In the state shown in FIG. 12, the convex portion 13c' and the flat face of the blade 7 are substantially in surface contact. The blade 7 can be almost completely prevented from being inclined to escape from the groove 11a in the illustrated state. By contrast, in the state shown in FIG. 13 or 14, the convex portion 13c' and the flat face of the blade 7' or 7" make a point contact, but the allowable range of the inclination of the blade 7' or 7" is restricted by a portion other than the convex portion 13c' which is in contact with the flat face of the blade 7' or 7". Therefore, it can be seen that the inclination of the blade 7' or 7" can be suppressed to a small degree (approximately the degree of a or b shown in the figures).

Figure 15:
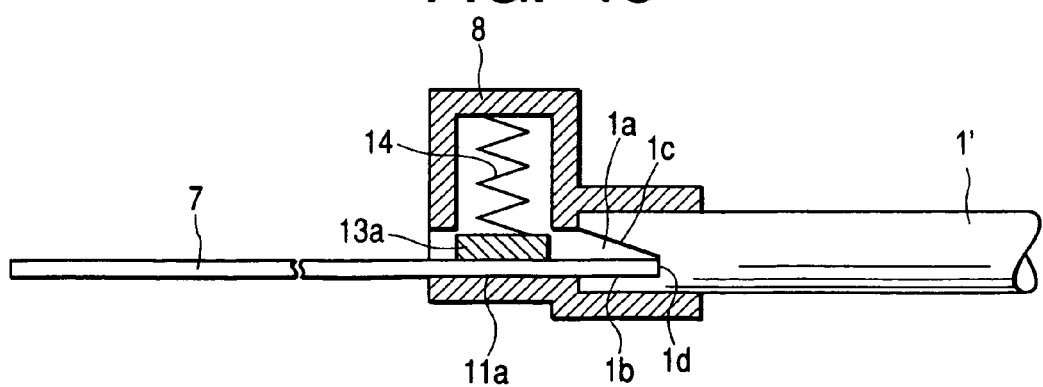
FIG. 15 is a section view taken along the line D—D in FIG. 11 showing the other embodiment of the electric-powered cutting machine of the invention.

Next, a further embodiment of the jigsaw of the invention will be described with reference to FIGS. 15 to 17. The components similar to those of the above-described embodiments are denoted by the same reference numerals, and their description is omitted.

The embodiment has a feature in the shape of the slot 1a formed in the plunger 1', into which the end portion of the attachment portion 7a of the blade 7 is to be inserted.

As shown in the figures, the slot 1a of the plunger 1' has: a first inner wall face 1b which is flush with the groove 11a of the blade receiving face 11; a second inner wall face 1c which is placed to be opposed to the first inner wall face 1b; and a third inner wall face 1d which is opposed to the end face of the blade 7.

The width of the third inner wall face 1d is substantially equal to the maximum width of the blade 7 which can be used. The second inner wall face 1c is formed as an inclined face which is continuous with a portion (an upper portion in the figures) of the third inner wall face 1d that is opposite to the first inner wall face 1b, and which extends to the upper face 10 of the blade holding portion 8.

As described above, to engage the attachment portion 7a of the blade 7 with the groove 11a, the attachment portion 7a must be moved by a distance corresponding to the depth of the groove 11a. Therefore, the slot 1a of the plunger 1' must be formed so as to allow the movement of the blade 7. Consequently, the width of the slot 1a of the plunger 1' cannot be set to be substantially equal to that of the blade 7. As a result, there is the possibility that, when a load is applied to the vicinity of the lower end of the blade 7, the blade is inclined so as to rotate around the convex portion 13c or 13c' pressing the flat face of the blade 7. The movement of the blade 7 is enabled by forming the second inner wall face 1c as an inclined face. The inclination of the blade 7 can be suppressed by setting the width of the third inner wall face 1d to be slightly larger than the thickness of the blade 7.

Figure 16:
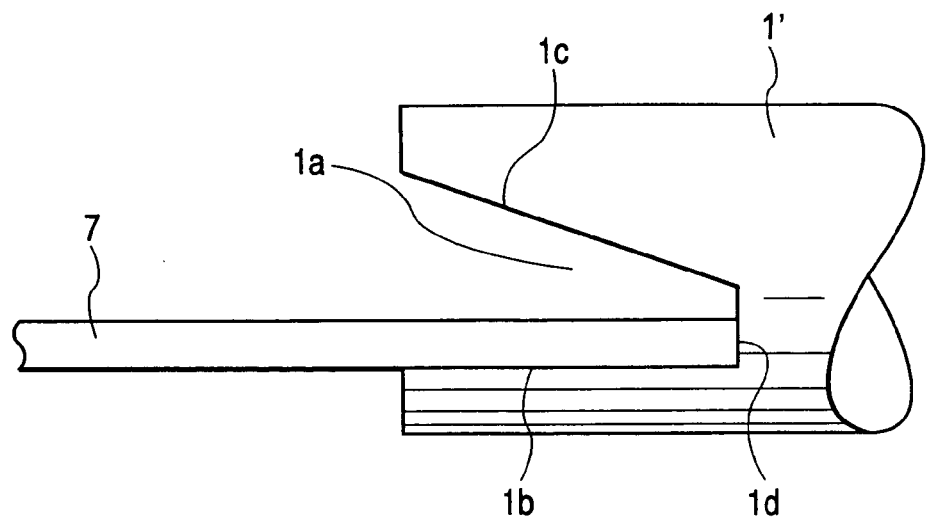
FIG. 16 is an enlarged bottom view of main portions of FIG. 15.
Figure 17:
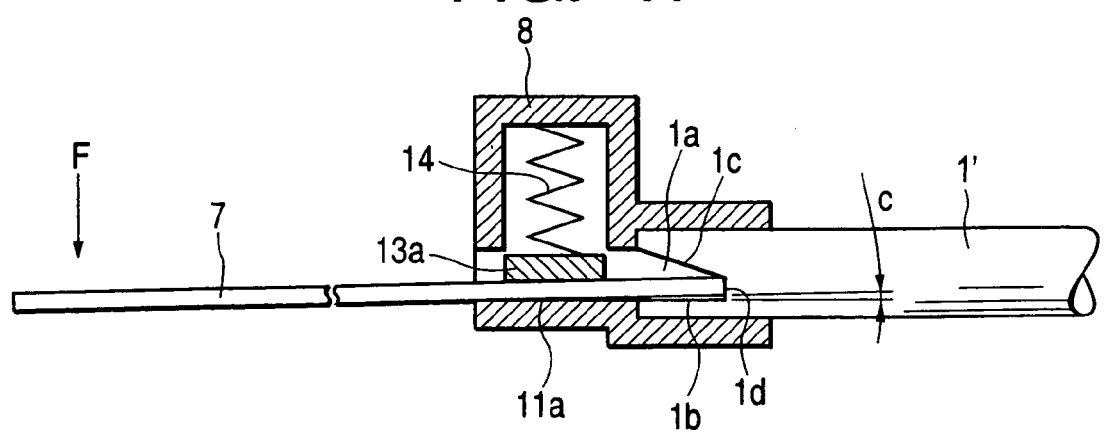
FIG. 17 is a section view taken along the line D—D in FIG. 11 showing an operation state of the other embodiment of the electric-powered cutting machine of the invention.
Figure 18:
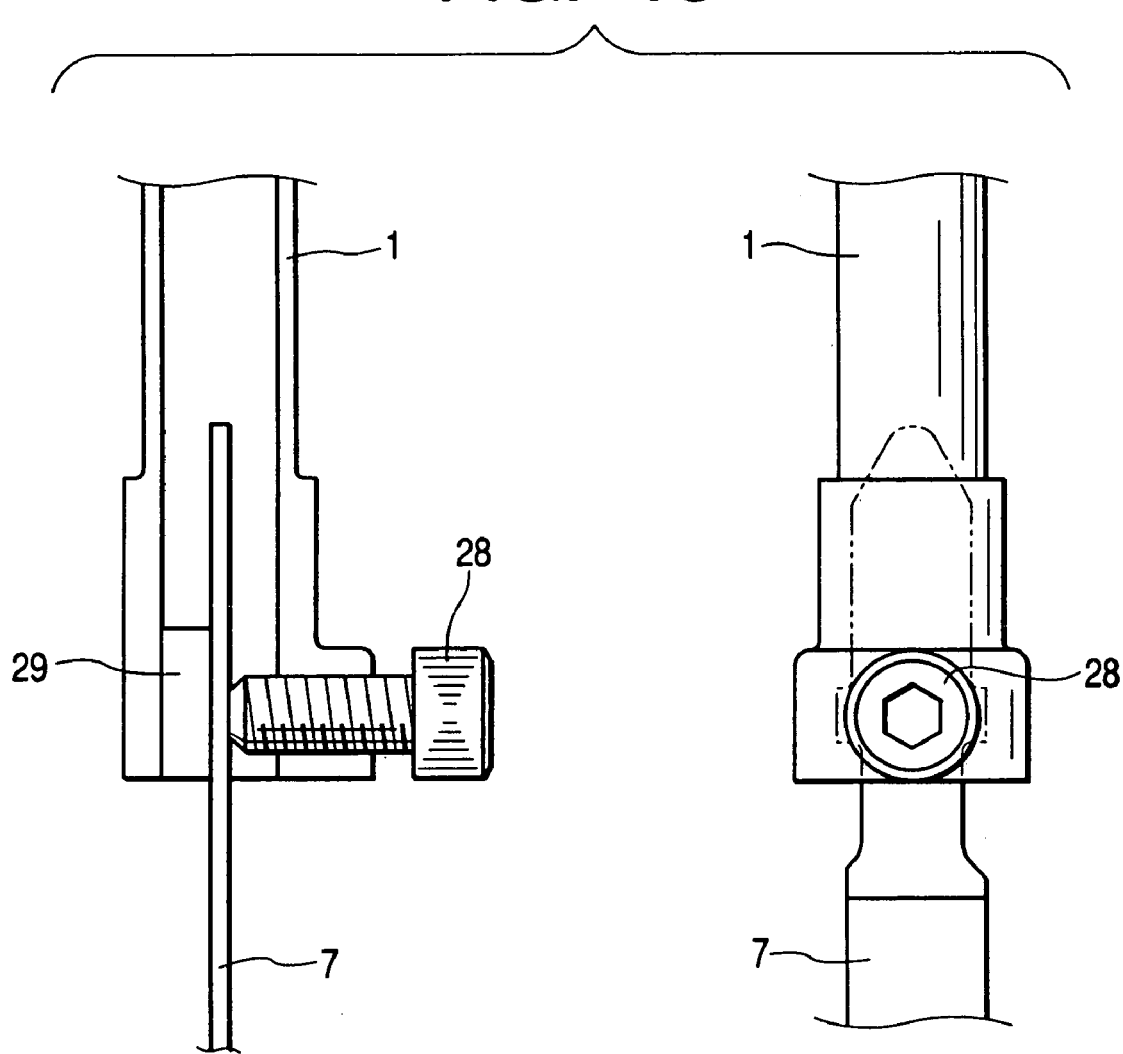
FIG. 18 shows an enlarged front view of main portions and a side view showing an example of a conventional electric-powered cutting machine.

FIGS. 16 and 17 are section views of main portions showing a state where the blade 7 of a width which is more frequently used is attached. As shown in FIG. 16, the width of the third inner wall face 1d is slightly different from that of the blade 7. As shown in FIG. 17, even when a load in the direction F shown in the figure is applied to the vicinity of the lower end (the left side in the figure) of the blade 7, the end face of the blade 7 on the side of the attachment portion 7a abuts against the second inner wall face 1c, whereby the inclination of the blade 7 is restricted. Therefore, it can be seen that the inclination of the blade 7 can be suppressed to a small degree (approximately the degree of about c shown in the figure).

In the embodiment, the work of attaching the blade 7 can be conducted in the following manner. When the blade 7 is to be inserted into the blade holding portion 8, the blade 7 is inserted with being inclined with respect to the longitudinal direction of the plunger 1'. The blade 7 is inserted until the end face is substantially contacted with the third inner wall face 1d of the slot 1a of the plunger 1'. Thereafter, the attachment portion 7a of the blade 7 is engaged with the groove 11a by a manual operation or pressing by the convex portion 13c or 13c' of the swinging member 13.

As described above, according to the invention, it is possible to provide a jigsaw in which, without increasing the weight of a plunger, vibrations during a cutting work can be suppressed and blade replacement can be conducted easily and in a short time.

What is claimed is:

1. A cutting machine comprising:
a housing;
a plunger held by the housing and protruding outward therefrom, the plunger being driven to reciprocate; and
a blade holding mechanism for receiving a blade disposed at a tip end portion of the plunger, said blade holding mechanism comprising:
a blade receiving face including a groove shaped substantially the same as an attachment portion of the blade; and
a swinging member having first and second ends and pivoted at a swing fulcrum, the swing fulcrum being formed on an axis substantially elongating in a longitudinal direction of the plunger, the first end having a blade pressing portion disposed opposite the groove, the second end elongating to separate from the plunger,
wherein a through hole which communicates with the groove is formed; and the second end of the swinging member is provided with a projecting portion to be inserted into the through hole to protrude into the groove.

2. The electric-powered cutting machine according to claim 1, wherein the plunger is provided with a slot into which an end portion of the blade is inserted; and
a bottom face of the blade holding mechanism forms an end face of the groove opposed to the plunger.

3. A cutting machine comprising:
a housing;
a plunger held by the housing and protruding outward therefrom, the plunger being driven to reciprocate;
an operation member pivoted on the housing; and
a blade holding mechanism disposed at a tip end portion of the plunger, the blade holding mechanism for receiving a blade, the blade including an attachment portion, the attachment portion including a pair of projections protruding outward from a longitudinal direction of the blade,
wherein the blade holding mechanism includes:
a blade receiving face including a groove, the groove shaped substantially the same as the attachment portion;
a swinging member having first and second ends and pivoted at a swing fulcrum, the swing fulcrum formed on an axis substantially elongating in a longitudinal direction of the plunger, the first end having a blade pressing portion at a substantially center position of the first end, the second end elongating to separate from the plunger; and
a pressing member which presses the first end toward the groove at a position more distant from the swing fulcrum than the blade pressing portion,
wherein the operation member is operated so as to abut against the second end, thereby making the swinging member swing against a pressing power of the pressing member,
wherein:
the blade holding mechanism further includes a blade holding portion formed separably from the plunger; and
the blade holding portion includes the blade receiving face on an inner wall face, holds the swinging member swingably, and holds the pressing member in a retaining manner, and
wherein said operation member comprises an abutting portion on one end thereof and an operation portion on the other end thereof, wherein the abutting portion is movable to abut the second end of the swinging member, and wherein the abutting portion is more distant from the operation portion than it is from the swing fulcrum.

4. The electric-powered cutting machine according to claim 3, wherein the blade pressing portion is flat-shaped so as to be placed substantially parallel to the groove.

5. The electric-powered cutting machine according to claim 3, wherein the plunger is provided with a slot into which an end portion of the blade is inserted, and
wherein the slot of the plunger has a first inner wall face, a second inner wall face and a third inner wall face;
the first inner wall face is flush with a face of the groove;
the third inner wall face is opposed to the end face of the blade and has a dimension substantially equal to a thickness of the blade;
the second inner wall face is positioned to be opposed to the first inner wall face; and the second inner wall face is an inclined face being continuous with a side portion of the third inner wall face opposite to the first inner wall face.

6. The cutting machine according to claim 3, wherein the force required to move the operation member such that the swinging member pivots at the swing fulcrum is smaller than the force exerted by the pressing member against the swinging member.

7. The cutting machine according to claim 3, wherein a pin functioning as the swing fulcrum is placed at a position which is separated from an outer periphery of the plunger; and
the pressing member presses the first end of the swinging member at a position more distant from the swing fulcrum than the groove.

8. The cutting machine according to claim 3, wherein the groove has a depth smaller than a thickness of the blade.

9. The cutting machine according to claim 3, wherein the operation member comprises:
a second swing fulcrum elongating in a direction substantially the same as a reciprocal motion direction of the plunger;
an abutting portion; and
an operation portion having an end which is remote from the second swing fulcrum,
wherein the operation member is operated by handling the operation portion so that the abutting portion abuts against the second end of the swinging member.

10. The cutting machine according to claim 9, wherein the abutting portion extends in a direction substantially the same as a reciprocal motion direction of the plunger so that the abutting portion abuts against the second end of the swinging member when the plunger is positioned in a reciprocal motion range thereof.

11. The cutting machine according to claim 9, further comprising a roller,
wherein the plunger is rockable in a cutting direction thereof;
the roller is disposed so as to press a face of the blade held by the blade holding mechanism, the face being a back face with respect to the cutting direction; and
the swing fulcrum of the swinging member is positioned more rearward in the cutting direction than a center axis of the plunger to enable the plunger to rock in a direction along which the plunger separates from the roller when the abutting portion abuts against the second end of the swinging member during a swinging operation of said operation member.

12. A cutting machine comprising:
a housing;
a plunger held by the housing and protruding outward therefrom, the plunger being driven to reciprocate;
an operation member pivoted at a first swing fulcrum on the housing; and
a blade holding mechanism disposed at an end portion of the plunger,
wherein the blade holding mechanism includes:
a swinging member having first and second ends and pivoted at a second swing fulcrum, the swing fulcrum formed on an axis substantially elongating in a longitudinal direction of the plunger, the first end having a blade pressing portion, the second end elongating to separate from the plunger; and
a pressing member which presses the first end toward the blade at a position more distant from the second swing fulcrum than the blade pressing portion, wherein the operation member is operated so as to abut against the second end and the operation member comprises an abutting portion on one end thereof and an operation portion on the other end thereof, wherein the abutting portion is movable to abut the second end of the swinging member, and wherein the abutting portion is more distant from the operation portion than it is from the first swing fulcrum.

13. The cutting machine according to claim 12, wherein the force required to move the operation member such that the swinging member pivots at the second swing fulcrum is smaller than the force exerted by the pressing member against the swinging member.

14. The cutting machine according to claim 12, wherein a pin functioning as the second swing fulcrum is placed at a position which is separated from an outer periphery of the plunger; and
the pressing member presses the first end of the swinging member at a position more distant from the second swing fulcrum than the blade pressing portion.

15. The cutting machine according to claim 12, wherein said first swing fulcrum elongates in a direction substantially the same as a reciprocal motion direction of the plunger.

16. The cutting machine according to claim 12, wherein:
the first swing fulcrum elongates in a direction substantially the same as a reciprocal motion direction of the plunger,
the operation portion comprises an end remote from the first swing fulcrum, and
the operation member is operated by handling the operation portion so that the abutting portion abuts against the second end of the swinging member.

17. The cutting machine according to claim 12, wherein the abutting portion extends in a direction substantially the same as a reciprocal motion direction of the plunger so that the abutting portion abuts against the second end of the swinging member when the plunger is positioned in a reciprocal motion range thereof.

18. The cutting machine according to claim 12, further comprising a roller,
wherein the plunger is rockable in a cutting direction thereof;
the roller is disposed so as to press a face of the blade held by the blade holding mechanism, the face being a back face with respect to the cutting direction; and
the swing fulcrum of the swinging member is positioned more rearward in the cutting direction than a center axis of the plunger to enable the plunger to rock in a direction along which the plunger separates from the roller when the abutting portion abuts against the second end of the swinging member during a swinging operation of said operation member.

19. The cutting machine according to claim 12, wherein the blade pressing portion is flat-shaped so as to be placed substantially parallel to a blade.

20. The cutting machine according to claim 12, wherein the plunger is provided with a slot into which an end portion of the blade is inserted; and
a bottom face of the blade holding mechanism forms an end face of a groove opposed to the plunger.

21. The cutting machine according to claim 20, wherein the slot of the plunger has a first inner wall face, a second inner wall face and a third inner wall face;
the first inner wall face is flush with a face of the groove;
the third inner wall face is opposed to the end face of the blade and has a dimension substantially equal to a thickness of the blade;
the second inner wall face is positioned to be opposed to the first inner wall face; and
the second inner wall face is an inclined face being continuous with a side portion of the third inner wall face opposite to the first inner wall face.

* * * * *